(12) United States Patent
Hodes et al.

(10) Patent No.: US 7,935,437 B2
(45) Date of Patent: May 3, 2011

(54) REVERSIBLY-ACTIVATED NANOSTRUCTURED BATTERY

(75) Inventors: Marc Scott Hodes, New Providence, NJ (US); Paul Robert Kolodner, Hoboken, NJ (US); Timofei Nikita Kroupenkine, Warren, NJ (US); Alan Michael Lyons, New Providence, NJ (US); Mary Louise Mandich, Martinsville, NJ (US); Joseph Ashley Taylor, Springfield, NJ (US); Donald Weiss, Cresskill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/775,177

(22) Filed: May 6, 2010

(65) Prior Publication Data

US 2010/0221597 A1   Sep. 2, 2010

Related U.S. Application Data

(62) Division of application No. 10/803,641, filed on Mar. 18, 2004, now Pat. No. 7,749,646.

(51) Int. Cl.
    *H01M 10/50* (2006.01)
(52) U.S. Cl. .......... 429/112; 429/62; 429/118; 429/122; 977/948
(58) Field of Classification Search .................. None
    See application file for complete search history.

(56) References Cited

U.S. PATENT DOCUMENTS

| | | | |
|---|---|---|---|
| 4,569,575 A | 2/1986 | Le Pesant et al. | |
| 4,749,198 A | 6/1988 | Brailean | |
| 5,254,415 A | 10/1993 | Williams et al. | |
| 6,185,961 B1 | 2/2001 | Tonucci et al. | |
| 6,231,744 B1 | 5/2001 | Ying et al. | |
| 6,911,280 B1 | 6/2005 | De Jonghe et al. | |
| 7,048,889 B2 | 5/2006 | Arney et al. | |
| 7,227,235 B2 | 6/2007 | Kroupenkine et al. | |
| 7,678,495 B2 * | 3/2010 | Kolodner et al. | 429/129 |
| 2003/0027613 A1 | 2/2003 | Hasebe et al. | |
| 2005/0106459 A1 | 5/2005 | Kroupenkine et al. | |
| 2005/0203613 A1 | 9/2005 | Arney et al. | |

OTHER PUBLICATIONS

Hodes, Marc et al.; Reserve Cell-Array Nanostructured Battery; U.S. Appl. No. 10/803,565, filed Mar. 18, 2004.
Kim, Joonwon et al; "Nanostructured Surfaces for Dramatic Reduction of Flow Resistance in Droplet-Based Microfluidics"; IEEE pp. 479-482 (2002) (no month).

* cited by examiner

*Primary Examiner* — John S Maples
(74) *Attorney, Agent, or Firm* — Hitt Gaines, PC (57) ABSTRACT

A battery includes a plurality of closed cells disposed in a predetermined feature pattern on at least a first surface of an electrode. Each of the closed cells has an inner surface. The battery also includes a plurality of cell electrodes. Each of the cell electrodes is disposed along a portion of the inner surface of a respective one of the closed cells in the plurality of closed cells.

20 Claims, 9 Drawing Sheets

REVERSIBLY-ACTIVATED NANOSTRUCTURED BATTERY

CROSS REFERENCE RELATED APPLICATION

This Application is a Divisional of U.S. application Ser. No. 10/803,641 filed on Mar. 18, 2004 now U.S. Pat. No. 7,749,646, to Marc Scott Hodes et al., entitled "REVERSIBLY-ACTIVATED NANOSTRUCTURED BATTERY", currently allowed, commonly assigned with the present invention and incorporated herein by reference.

TECHNICAL FIELD

The present invention relates generally to batteries and, more particularly, to batteries having nanostructured surfaces.

BACKGROUND

Figure 1:
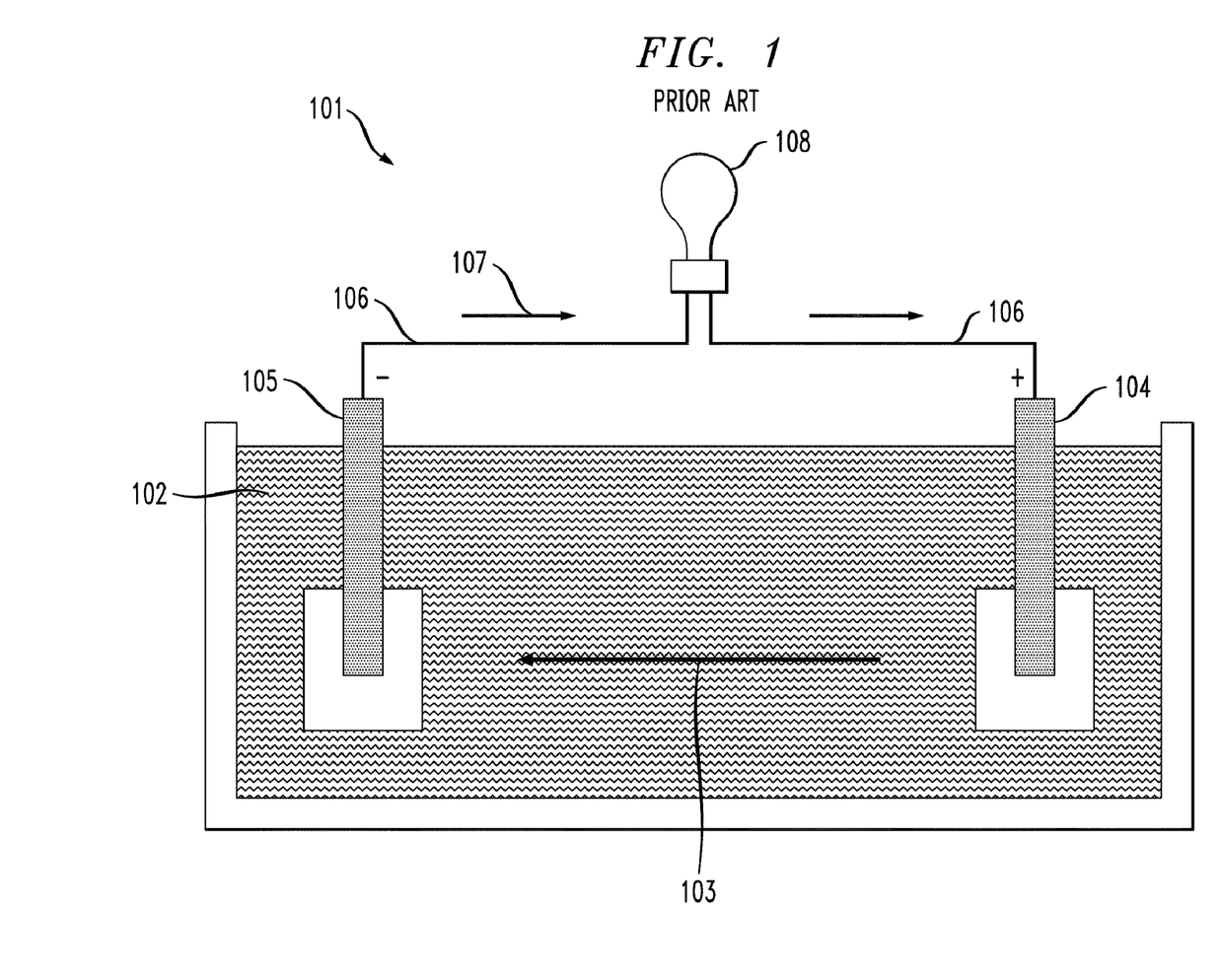
FIG. 1 shows a prior art liquid-cell battery as used in an electrical circuit.

Many beneficial devices or structures in myriad applications rely on batteries as a power source. A typical liquid-cell battery, such as battery 101 in FIG. 1, is characterized by an electrolyte liquid 102 which provides a mechanism for an electrical charge to flow in direction 103 between a positive electrode 104 and a negative electrode 105. When such a battery 101 is inserted into an electrical circuit 106 with illustrative load 108, it completes a loop which allows electrons to flow in direction 107 around the circuit 106. The positive electrode 104 thus receives electrons from the external circuit 106. These electrons then react with the materials of the positive electrode 104 in reduction reactions that generate the flow of a charge to the negative electrode 105 via ions in the electrolyte liquid 102. At the negative electrode 105, oxidation reactions between the materials of the negative electrode 104 and the charge flowing through the electrolyte fluid 102 result in surplus electrons that are released to the external circuit 106.

As the above process continues, the active materials of the positive and negative electrodes 104 and 105, respectively, eventually become depleted and the reactions slow down until the battery is no longer capable of supplying electrons. At this point the battery is discharged. It is well known that, even when a liquid-cell battery is not inserted into an electrical circuit, there is often a low level reaction with the electrodes 104 and 105 that can eventually deplete the material of the electrodes. Thus, a battery can become depleted over a period of time even when it is not in active use in an electrical circuit. This period of time will vary depending on the electrolyte fluid used and the materials of the electrodes.

More recently, batteries having at least one nanostructured surface have been proposed wherein nanostructures are used to separate the electrolyte from the electrode until such a time that the battery is to be used. This is typically referred to as a reserve battery (as opposed to a primary battery that is manufactured with the electrolyte in contact with the electrodes of the battery). An example of the use of electrowetting principles applied to reserve batteries is described in copending U.S. patent application Ser. No. 10/716,084 filed Nov. 18, 2003 and entitled "Electrowetting Battery Having Nanostructured Surface," which is hereby incorporated by reference herein in its entirety. As disclosed in the '084 application, when it is desired that the battery generate a current, the electrolyte is caused to penetrate the nanostructured surface and to come into contact with the electrode of the battery, thus resulting in the above-discussed flow of electrons around a circuit. Such a penetration of nanostructures is achieved, for example, by applying a voltage to the nanostructures such that the contact angle of the electrolyte relative to the nanostructured surface is decreased. When the contact angle is decreased, the electrolyte penetrates the nanostructures and is brought into contact with the electrode.

SUMMARY

The present inventors have realized that, while prior reserve and primary batteries were useful in many regards, they were limited in certain aspects. In particular, once the batteries were manufactured and activated (in the case of a reserve battery), it was typically impossible to return the batteries to a reserve state (i.e., to separate the electrolyte from the battery electrodes).

Therefore, the present inventors have invented a small battery having a nanostructured battery electrode wherein it is possible to reverse the contact of the electrolyte with the battery electrode and, thus, to return a battery to a reserve state after it has been used to generate current. In order to achieve this reversibility, the nanostructures on the battery electrode comprise a plurality of closed cells and the pressure within the enclosed cells is varied. In a first embodiment, the pressure is varied by varying the temperature of a fluid within the cells by, for example, applying a voltage to electrodes disposed within said cells. In a second illustrative embodiment, once the battery has been fully discharged, the battery is recharged and then the electrolyte fluid is expelled from the cells in a way such that it is no longer in contact with the battery electrode.

BRIEF DESCRIPTION

Reference is now made to the following descriptions taken in conjunction with the accompanying drawings, in which.

DETAILED DESCRIPTION

Figure 2:
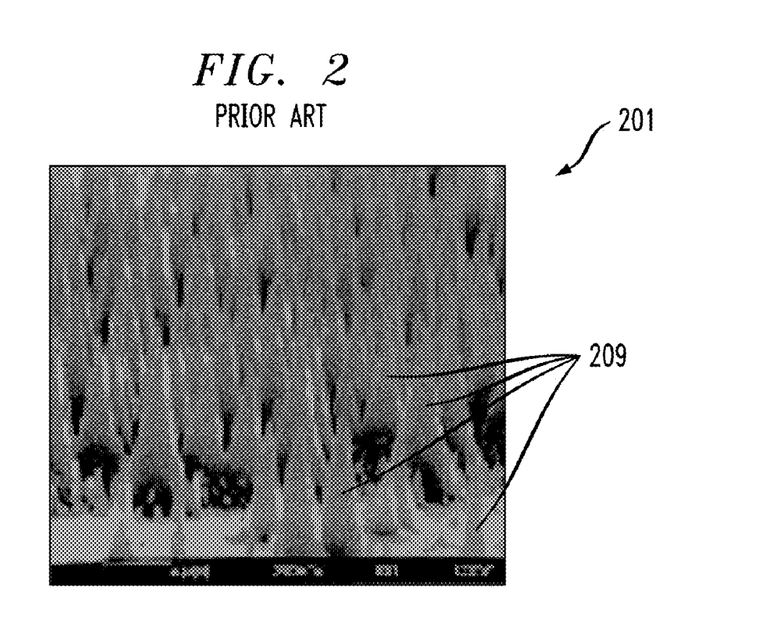
FIG. 2 shows a prior art nanopost surface.

FIG. 2 shows an illustrative nanopost pattern 201 with each nanopost 209 having a diameter of less than 1 micrometer. While FIG. 2 shows nanoposts 209 formed in a somewhat conical shape, other shapes and sizes are also achievable. In fact, cylindrical nanopost arrays have been produced with each nanopost having a diameter of less than 10 nm. Specifically, FIGS. 3A-3E show different illustrative arrangements of nanoposts produced using various methods and further show that such various diameter nanoposts can be fashioned with different degrees of regularity. Moreover, these figures show that it is possible to produce nanoposts having various diameters separated by various distances. An illustrative method of producing nanoposts, found in U.S. Pat. No. 6,185,961, titled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching.

Figures 3A, 3C:
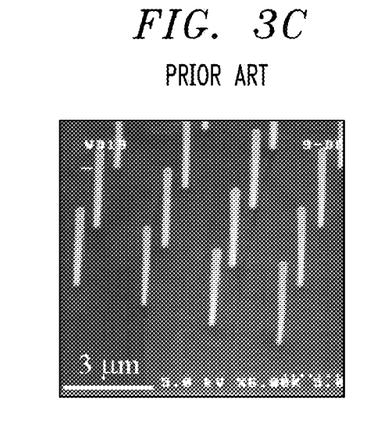
FIGS. 3A, 3B, 3C, 3D and 3E show various prior art nanostructure feature patterns of predefined nanostructures that are suitable for use in the present invention.
Figure 3A:
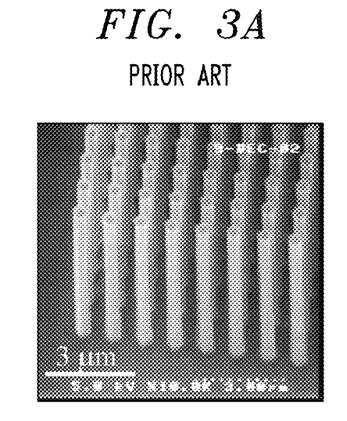
Figure 3B:
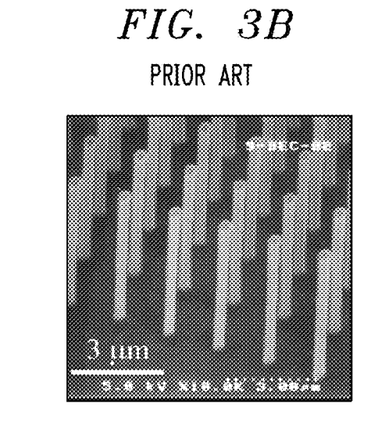
Figure 3D:
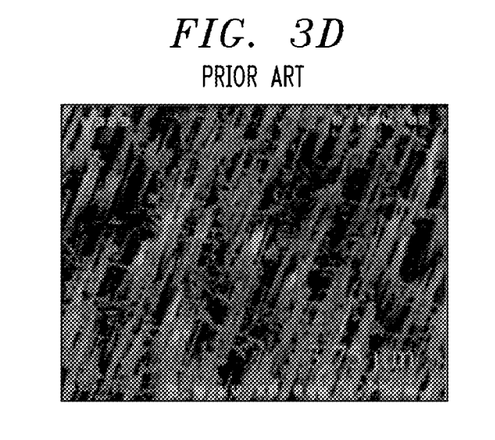
Figure 3E:
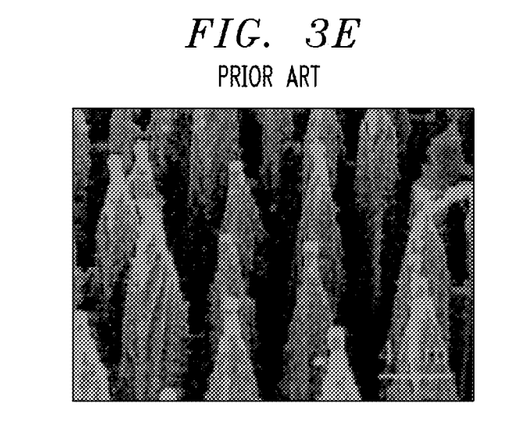
Figure 4:
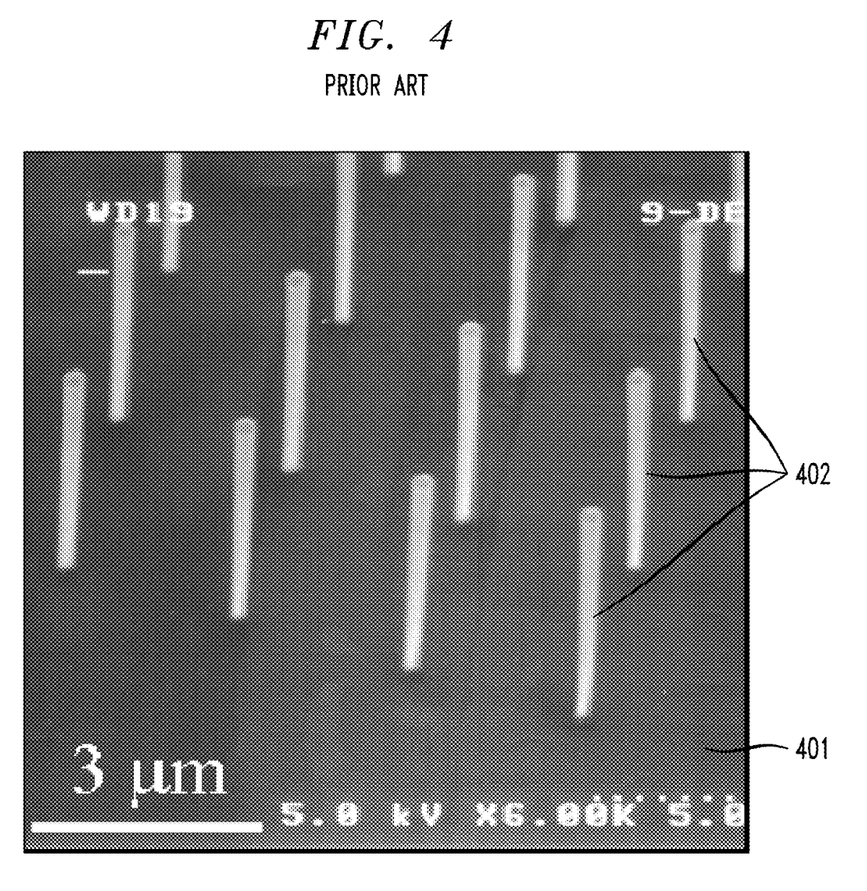
FIG. 4 shows a more detailed view of the prior art nanostructure feature pattern of FIG. 3C.

FIG. 4 shows the illustrative known surface 401 of FIG. 3C with a nanostructure feature pattern of nanoposts 402 disposed on a substrate. Throughout the description herein, one skilled in the art will recognize that the same principles applied to the use of nanoposts or nanostructures can be equally applied to microposts or other larger features in a feature pattern. The surface 401 and the nanoposts 402 of FIG. 4 are, illustratively, made from silicon. The nanoposts 402 of FIG. 4 are illustratively approximately 350 nm in diameter, approximately 6 µM high and are spaced approximately 4 µm apart, center to center. It will be obvious to one skilled in the art that such arrays may be produced with regular spacing or, alternatively, with irregular spacing.

As typically defined a "nanostructure" is a predefined structure having at least one dimension of less than one micrometer and a "microstructure" is a predefined structure having at least one dimension of less than one millimeter. However, although the disclosed embodiments refer to nanostructures and nanostructured surfaces, it is intended by the present inventors, and will be clear to those skilled in the art, that microstructures may be substituted in many cases. Accordingly, the present inventors hereby define nanostructures to include both structures that have at least one dimension of less than one micrometer as well as those structures having at least one dimension less than one millimeter. The term "feature pattern" refers to either a pattern of microstructures or a pattern of nanostructures. Further, the terms "liquid," "droplet," and "liquid droplet" are used herein interchangeably. Each of those terms refers to a liquid or a portion of liquid, whether in droplet form or not.

Figure 5A:
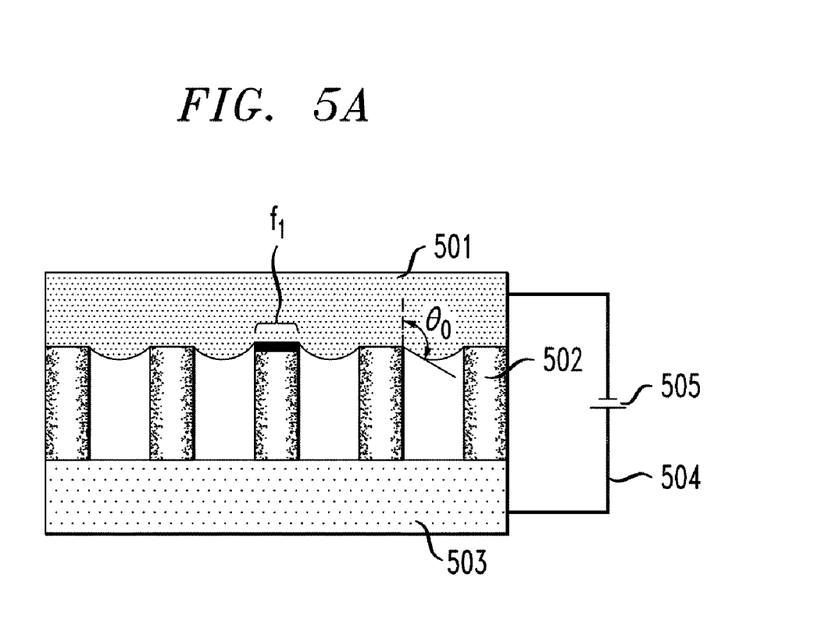
FIGS. 5A and 5B show a device in accordance with the principles of the present invention whereby electrowetting principles are used to cause a liquid droplet to penetrate a nanostructure feature pattern.
Figure 5B:
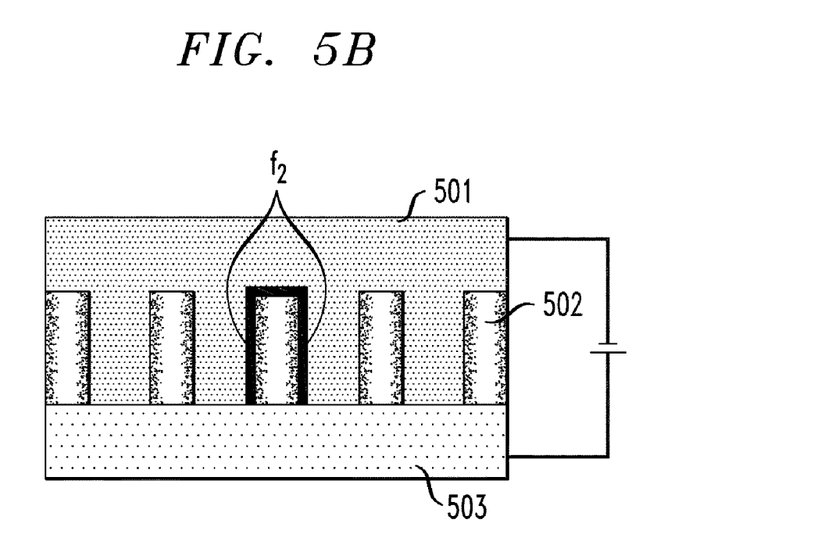

In many applications, it is desirable to be able to control the penetration of a given liquid into a given nanostructured or microstructured surface and, thus, control the contact of the liquid with the underlying substrate supporting the nanostructures or microstructures. FIGS. 5A and 5B show one embodiment where electrowetting is used to control the penetration of a liquid into a nanostructured surface. Electrowetting principles and controlling the movement of a liquid across a nanostructured or microstructured surface are generally described in U.S. patent application Ser. No. 10/403,159 filed Mar. 31, 2003 and titled "Method and Apparatus for Variably Controlling the Movement of a Liquid on a Nanostructured Surface," which is hereby incorporated by reference herein in its entirety. As discussed previously, the general use of electrowetting principles in batteries is described in above-referenced copending U.S. patent application Ser. No. 10/716,084.

Figure 6:
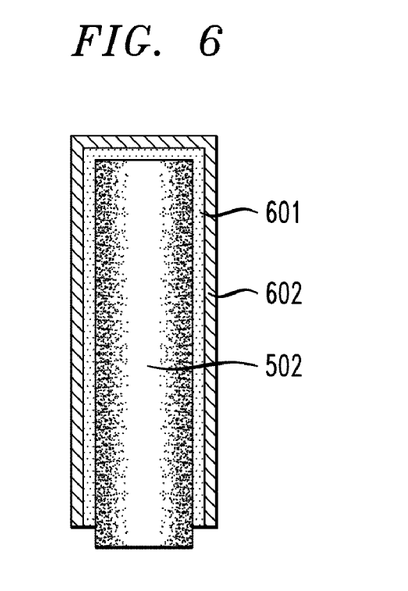
FIG. 6 shows the detail of an illustrative nanopost of the nanostructure feature pattern of FIGS. 5A and 5B.

Referring to FIG. 5A, a droplet 501 of conducting liquid (such as an electrolyte solution in a liquid-cell battery) is disposed on nanostructure feature pattern of cylindrical nanoposts 502, as described above, such that the surface tension of the droplet 501 results in the droplet being suspended on the upper portion of the nanoposts 502. In this arrangement, the droplet only covers surface area $f_1$ of each nanopost and has a contact angle with each nanopost of, for example, $\theta_0$. The nanoposts 502 are supported by the surface of a conducting substrate 503. Droplet 501 is illustratively electrically connected to substrate 503 via lead 504 having voltage source 505. An illustrative nanopost is shown in greater detail in FIG. 6. In that figure, nanopost 502 is electrically insulated from the liquid (501 in FIG. 5A) by material 601, such as an insulating layer of dielectric material. The nanopost is further separated from the liquid by a low surface energy material 602, such as a well-known fluoro-polymer. Such a low surface energy material allows one to obtain an appropriate initial contact angle (i.e., $\theta_0$) between the liquid and the surface of the nanopost. It will be obvious to one skilled in the art that, instead of using two separate layers of different material, a single layer of material that possesses sufficiently low surface energy and sufficiently high insulating properties could be used.

FIG. 5B shows that, by applying a low voltage (e.g., 10-20 volts) to the conducting droplet of liquid 501, a voltage difference results between the liquid 501 and the nanoposts 502. The contact angle between the liquid and the surface of the nanopost decreases and, at a sufficiently low contact angle, the droplet 501 moves down in the y-direction along the surface of the nanoposts 502 and penetrates the nanostructure feature pattern until it completely surrounds each of the nanoposts 502 and comes into contact with the upper surface of substrate 503. In this configuration, the droplet covers surface area $f_2$ of each nanopost. Since $f_2 \gg f_1$, the overall contact area between the droplet 501 and the nanoposts 502 is relatively high such that the droplet 501 contacts the substrate 503. One skilled in the art will recognize that other methods of causing the electrolyte to penetrate the nanostructures, such as decreasing the temperature of the electrodes, can be used. The present invention is intended to encompass any such method of causing such penetration.

Figure 7:
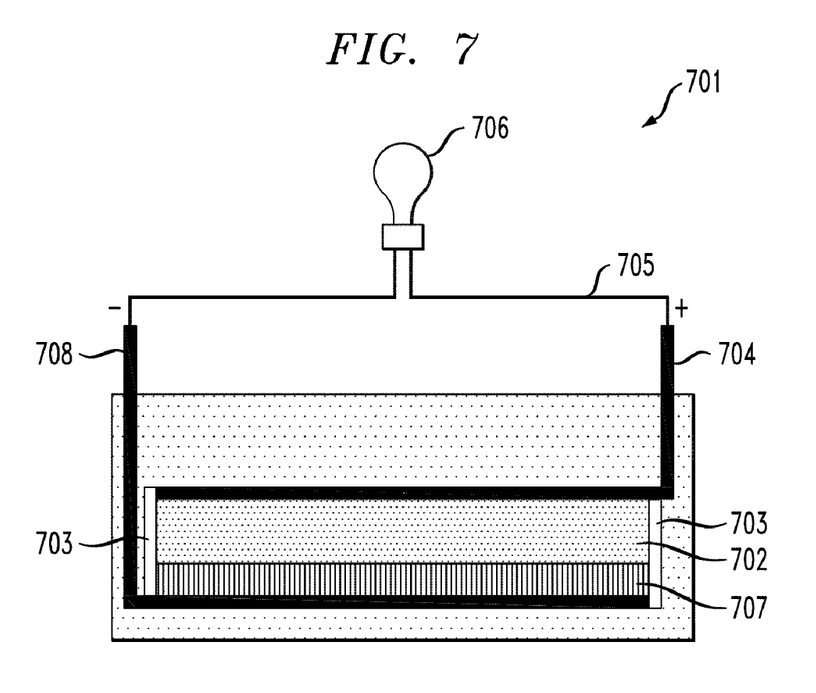
FIG. 7 shows an illustrative liquid-cell battery in accordance with the principles of the present invention wherein the electrolyte in the battery is separated from the negative electrode by nanostructures.

FIG. 7 shows an illustrative battery 701 whereby an electrolyte fluid 702 is contained within a housing having containment walls 703. The electrolyte fluid 702 is in contact with positive electrode 704, but is separated from negative electrode 708 by nanostructured surface 707. Nanostructured surface 707 may be the surface of the negative electrode or, alternatively, may be a surface bonded to the negative electrode. One skilled in the art will recognize that the nanostructured surface could also be used in association with the positive electrode with similarly advantageous results. In FIG. 7, the electrolyte fluid is suspended on the tops of the nanoposts of the surface, similar to the droplet of FIG. 5A. The battery 701 is inserted, for example, into electrical circuit 705 having load 706. When the electrolyte liquid 702 is not in contact with the negative electrode, there is substantially no reaction between the electrolyte and the electrodes 704 and 708 of the battery 701. Accordingly, there is no depletion of the materials of the electrodes. Thus, it is possible to store the battery 701 for relatively long periods of time without the battery becoming discharged.

Figure 8:
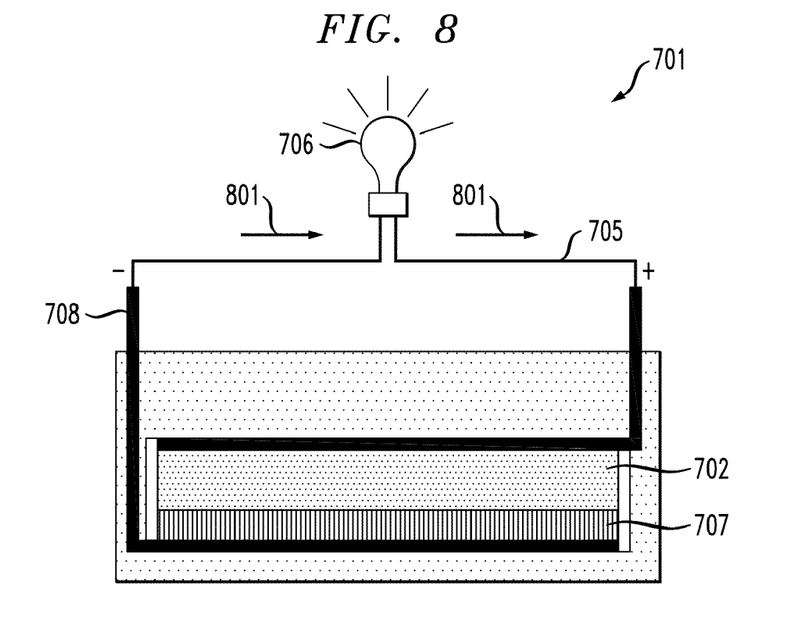
FIG. 8 shows the illustrative battery of FIG. 7 wherein the electrolyte in the battery is caused to penetrate the nanostructures and to thus contact the negative electrode.

FIG. 8 shows the battery 701 of FIG. 7 inserted into electrical circuit 705 wherein, utilizing the electrowetting principles described above, a voltage is applied to the nanostructured surface 707 thus causing the electrolyte fluid 702 to penetrate the surface 707 and to come into electrical contact with the negative electrode 708. One skilled in the art will recognize that this voltage can be generated from any number of sources such as, for example, by passing one or more pulses of RF energy through the battery. When the penetration of the electrolyte into the nanostructures occurs, electrons begin flowing in direction 801 through the circuit 705, as described above, and the load 706 is powered. Thus, the embodiment of FIGS. 7 and 8 show how a battery can be stored without depletion for a relatively long period of time and can then be "turned on" at a desired point in time to power one or more electrical loads in an electrical circuit.

The battery described in FIGS. 7 and 8 is referred to as a reserve battery or, in other words, a battery that is manufactured with the electrolyte separated from at least one of the electrodes in the battery. Primary batteries, on the other hand, are batteries that are manufactured with the electrolyte in contact with the electrodes of the battery. As such, primary batteries are always undergoing oxidation reactions, even when not inserted in an electrical circuit. Therefore, primary batteries typically have a relatively short shelf-life relative to reserve batteries.

The present inventors have recognized that it would be desirable to be able to selectively turn on and off the generation of current in a battery. Such a capability would have many novel uses. For example, the battery could be turned on only when it was needed, thus preventing excess oxidation that could lead to premature discharge of the battery. Additionally, such a capability could lead to a new category of reserve rechargeable batteries that, once recharged, can be turned off. As is well-known, rechargeable batteries (also referred to herein as secondary batteries) are batteries in which the electrodes can be regenerated by reversing the current flow to and within the battery. While it is possible to recharge the reserve nanostructured batteries described previously, no effective methods have yet been realized for returning the recharged battery to a reserve state once it is recharged.

The present inventors have further realized that, in the nanostructured batteries discussed above herein, it would be desirable to reverse the penetration of the electrolyte in a way such that it is restored to its original reserve position suspended on the nanostructures above the electrode. Reversible penetration of nanostructured or microstructured surfaces by a droplet of liquid is the subject of copending U.S. patent application Ser. No. 10/674,448, filed Sep. 30, 2003 and entitled "Reversible Transitions on Dynamically Tunable Nanostructured or Microstructured Surfaces," which is hereby incorporated by reference herein in its entirety.

Figure 9A:
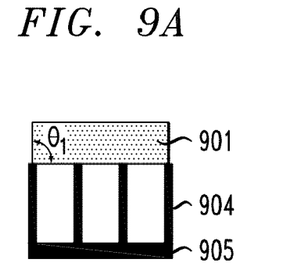
FIGS. 9A, 9B and 9C show a battery with the principles of the present invention wherein a droplet of electrolyte is disposed in an initial position suspended on top of a nanostructured feature pattern (FIG. 9A), is caused to penetrate the feature pattern (FIG. 9B), and is then caused to return to a position suspended on top of the feature pattern (FIG. 9C)
Figure 9B:
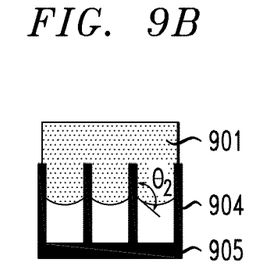
Figure 9C:
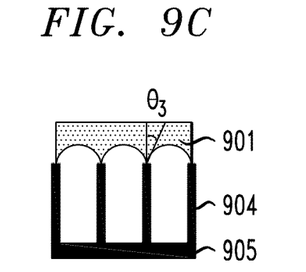
Figure 10A:
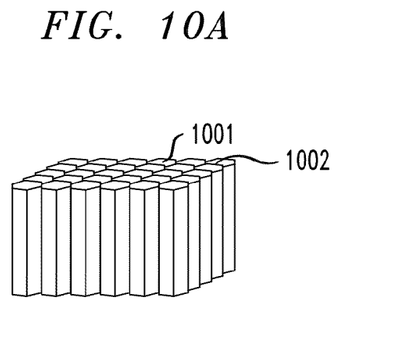
FIGS. 10A and 10B show an illustrative closed-cell structure in accordance with the principles of the present invention.
Figure 10B:
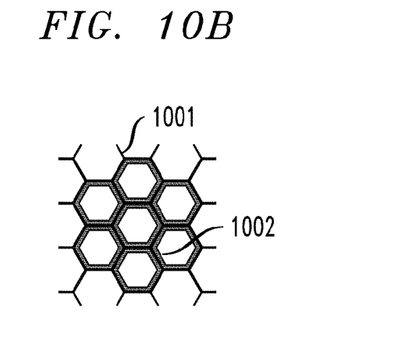
Figure 11A:
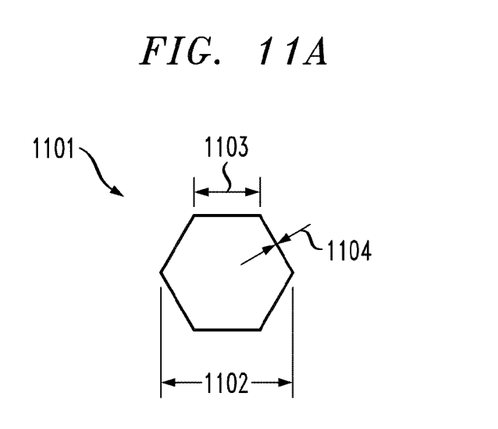
FIGS. 11A and 11B show the detail of one cell in the illustrative structure of FIGS. 10A and 10B.
Figure 11B:
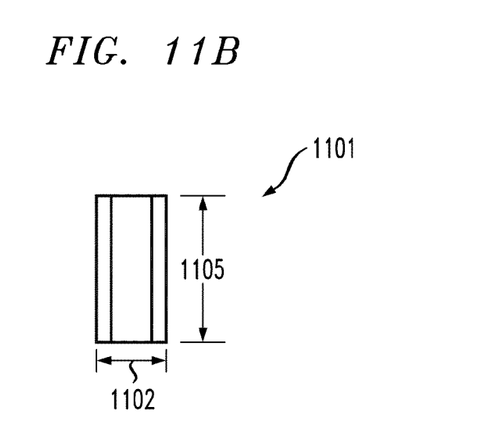

FIGS. 9A, 9B and 9C illustrate a selective/reversible penetration of droplet 901, which is illustratively a droplet of electrolyte such as electrolyte 702 in FIG. 7 into nanostructure pattern 904. Specifically, FIG. 9A shows electrolyte droplet 901 disposed on a nanostructure or microstructure feature pattern 904 that is supported by substrate 905 (which is, illustratively, the electrode 503 in FIG. 5A). Next, as shown in FIG. 9B and discussed above, droplet 901 is caused to penetrate the feature pattern 904. Finally, as shown in FIG. 9C, it is desirable to reverse the penetration of droplet 901. FIGS. 10A and 10B show, respectively, a three-dimensional view and a top cross-sectional view of an illustrative feature pattern in accordance with the principles of the present invention that is capable of accomplishing the reversible penetration shown in FIGS. 9A-9C. Specifically, in the present illustrative embodiment represented by FIGS. 10A and 10B, the feature pattern does not comprise a number of posts spaced a distance away from each other. Instead, a number of closed cells 1001, here illustrative cells of a hexagonal cross section, are used. Each cell 1001 has an electrode 1002 disposed along the inner wall of the cell. As used herein, the term closed cell is defined as a cell that is enclosed on all sides except for the side upon which a liquid, such as an electrolyte liquid, is intended to be disposed. One skilled in the art will recognize that other, equally advantageous cell configurations and geometries are possible to achieve equally effective closed-cell arrangements. FIGS. 11A and 11B show a top cross-sectional view and a side view of an illustrative individual cell of the feature pattern of FIGS. 10A and 10B. Specifically, referring to FIG. 11A, each individual cell 1101 is characterized by a maximum width 1102 of width d, an individual side length 1103 of length d/2 and a wall thickness 1104 of thickness t. Referring to FIG. 11B, the height 1105 of cell 1101 is height h.

Figure 12A:
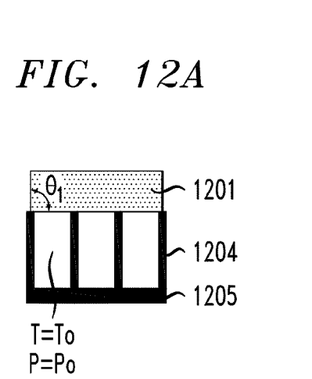
FIGS. 12A, 12B and 12C show a battery in accordance with the principles of the present invention wherein a droplet of electrolyte is disposed in an initial position suspended on top of a nanostructured feature pattern (FIG. 12A), is caused to penetrate the feature pattern (FIG. 12B), and is then caused to return to a position suspended on top of the feature pattern (FIG. 12C).
Figure 12B:
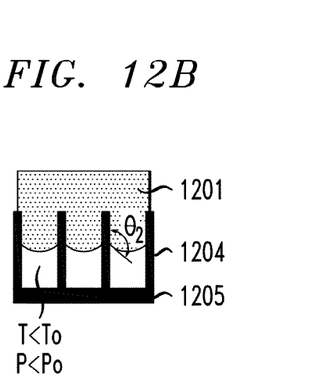
Figure 12C:
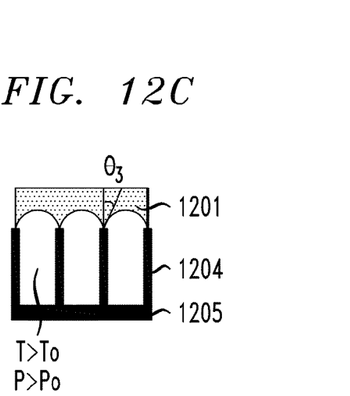

FIGS. 12A, 12B and 12C show how an illustrative closed-cell feature pattern similar to the feature pattern of FIGS. 10A and 10B, here shown in cross-section, may be used illustratively to cause a droplet 1201 of liquid to reversibly penetrate the feature pattern. Specifically, each cell within feature pattern 1204, such as cell 1101 having a hexagonal cross-section, is a completely closed cell once the droplet of liquid covers the opening of that cell. Thus, referring to FIG. 12A, each such closed cell over which the droplet is disposed contains a fluid having an initial temperature $T=T_0$ and an initial pressure $P=P_0$. As used herein, the term fluid is intended to encompass both gases (such as, illustratively, air) and liquids that could be disposed within the cells of the feature pattern. The present inventors have recognized that, by changing the pressure within the individual cells, such as cell 1101, the liquid droplet 1201 can be either drawn into the cells or, alternatively, repelled out of the cell. Specifically, referring to FIG. 12B, if the pressure within the cell 1101 is caused to be below the initial pressure (i.e., $P<P_0$), then the droplet above that cell will be drawn into the cell a distance related to the magnitude in reduction of the pressure P. Such a reduction in pressure may be achieved, illustratively, by reducing the temperature of the fluid within the cells such that $T<T_0$. Such a temperature reduction may be achieved, illustratively, by reducing the temperature of the substrate 1205 and/or the feature pattern 1204. One skilled in the art will recognize that any method of reducing the pressure within the cells, including any other method of reducing the temperature of the fluid within the cells, will have similar results. For example, each of the cells could be connected either in series or in parallel to one or more remote ballast gas reservoirs. The pressure of the gas in this reservoir could be changed, thus raising or lowering the pressure in the cells. Similarly, the pressure within the cells could be changed by moving a diaphragm disposed within each of the cells, thus displacing a fluid within the cell and varying the pressure within that cell. Additionally, as discussed more fully in the aforementioned copending patent applications, electrowetting may be used instead of pressure reduction to draw the liquid into the cells of the feature pattern 1204. Specifically, by applying a voltage to the conducting droplet 1201, a voltage difference results between the liquid and the cells in the feature pattern 1204. Hence, as discussed herein above, the droplet 1201 moves down and penetrates the nanostructure feature pattern 1204 until it comes into contact with the upper surface of substrate 1205. Other methods of changing the pressure within the cells will be readily apparent to one skilled in the art in light of the teachings herein.

FIG. 12C shows how, by increasing the pressure to or above the initial pressure $P_0$, it is possible to reverse the penetration of the droplet 1201, whether that penetration was initiated by pressure reduction or by electrowetting. Once again, such a pressure increase may be achieved by changing the temperature of the fluid within the cells, illustratively in FIG. 8C to a temperature greater than the initial temperature $T_0$. One illustrative method if increasing this temperature is to apply a voltage to electrodes 1002 in FIG. 10 in a way such they heat the insides of the cells. The increased temperature will increase the pressure within the cells above the initial pressure $P_0$. The contact angle between the droplet and the elements of the feature pattern will thus change to $\theta_3$, which is smaller than $\theta_1$ and the liquid will move out of the cells, thus returning droplet 1201 to a very low flow resistance contact with feature pattern 1204. Once again, one skilled in the art will recognize that any method of increasing the pressure within the cells to reverse the penetration of the droplet 1201, including any other method of increasing the temperature of the fluid within the cells, will have similar results.

Figure 12D:
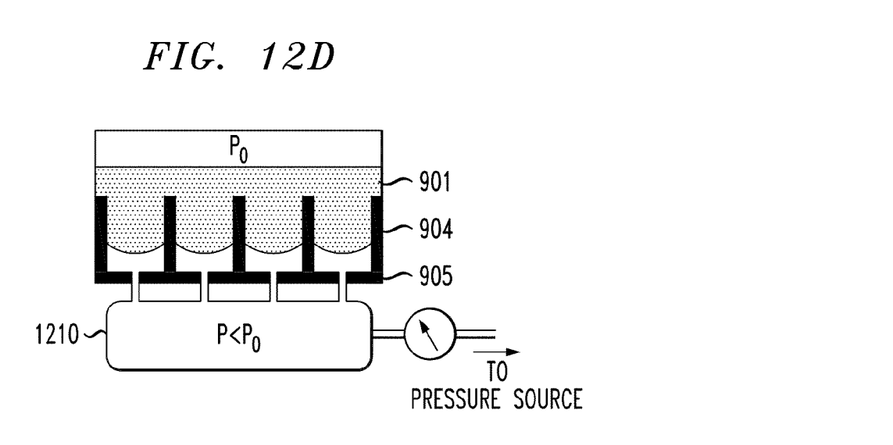
Figure 12E:
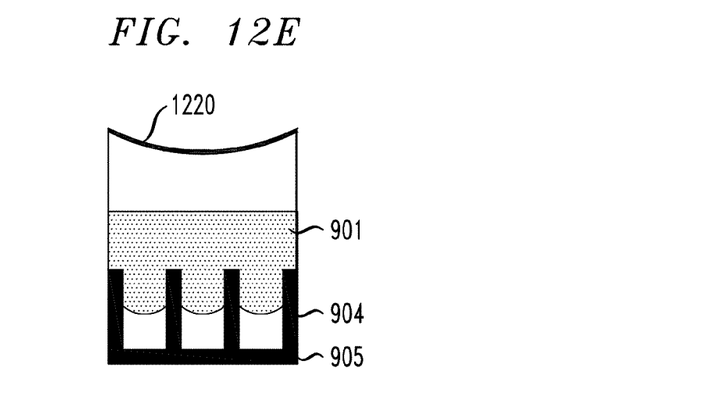
Figure 12F:
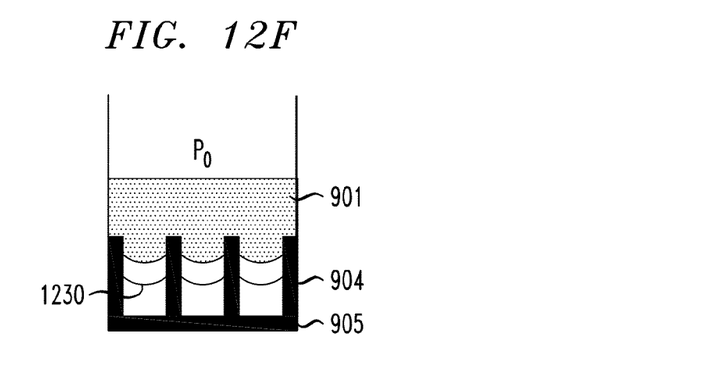

FIGs. 12D-12F illustrate aspects of embodiments discussed above. FIG. 12D illustrates an embodiment in which penetration of the closed cells of the pattern 904 by the droplet 901 is controlled by pressure applied via a ballast gas reservoir 1210. In FIG. 12E the penetration of the closed cells by the droplet 901 is controlled by pressure applied via a diaphragm 1220. In FIG. 12F the penetration of the closed cells by the droplet 901 is controlled by pressure applied via a diaphragm 1230 within each closed cell.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. For example, while the embodiment disclosed herein is a battery having nanostructured surfaces, one skilled in the art will appreciate that such nanostructured surfaces may be used for other uses, such as in use as a thermostat. In such a case, the characteristics of the pattern of nanostructures and the liquid in contact with the nanostructures can be chosen in a way such that, upon a temperature increase of known amount, the liquid will penetrate the surface, thus achieving a desired result. One skilled in the art will be able to devise many similar uses of the underlying principles associated with the present invention, all of which are intended to be encompassed herein. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A battery comprising:
    an electrode having at least a first surface;
    a plurality of closed cells disposed in a predetermined feature pattern on said at least a first surface, each of said closed cells having an inner surface; and
    a plurality of cell electrodes, each of said cell electrodes being disposed along a portion of said inner surface of a respective one of said closed cells in said plurality of closed cells.

2. The battery of claim 1, wherein said closed cells have a hexagonal cross section.

3. The battery of claim 1, wherein said cell electrodes are configured to cause an electrolyte in contact with said closed cells to electrowet said closed cells.

4. The battery of claim 1, wherein said cell electrodes are configured to cause a pressure change of a fluid within said cell electrodes thereby changing a degree of penetration of an electrolyte liquid in contact with said closed cells.

5. The battery of claim 1, wherein said cell electrodes are configured to heat a fluid located within said closed cells.

6. The battery of claim 5, wherein said fluid is a gas.

7. The battery of claim 1, further comprising one or more ballast gas reservoirs configured to change a pressure of a gas within said plurality of closed cells.

8. The battery of claim 1, further comprising a diaphragm within each of said plurality of closed cells.

9. The battery of claim 8, wherein said diaphragm is configured to change a pressure of a gas within said closed cells.

10. The battery of claim 1, wherein said electrodes are configured to reduce a temperature thereof to cause a fluid to penetrate said closed cells.

11. The battery as recited in claim 1, further comprising an electrolyte liquid in contact with said closed cells.

12. The battery of claim 11, wherein a temperature of said electrolyte liquid is increased or decreased to reversibly change a degree of penetration of said closed cells by said electrolyte liquid.

13. The battery of claim 11, wherein said cell electrodes are configured to receive a current, thereby causing a temperature of said electrolyte liquid to increase.

14. The battery of claim 11, wherein said closed cells have a hexagonal cross section.

15. The battery of claim 11, wherein a degree of penetration of said electrolyte liquid into said closed cells is controlled by changing a pressure of a fluid disposed within said closed cells.

16. The battery of claim 15, wherein said fluid is a gas.

17. The battery of claim 15, wherein said fluid is said electrolyte liquid.

18. The battery of claim 11, wherein a degree of penetration of said electrolyte liquid into said closed cells is controlled by changing a contact angle formed between said electrolyte liquid and said closed cells.

19. The battery of claim 11, wherein said cell electrodes are configured to change a degree of penetration of said electrolyte liquid into said closed cells by causing said electrolyte liquid to electrowet said closed cells.

20. The battery of claim 11, wherein said electrode is configured to change a temperature of said electrolyte liquid, thereby changing a degree of penetration of said electrolyte liquid into said closed cells.

* * * * *